(12) United States Patent
Huhtala

(10) Patent No.: US 6,990,325 B2
(45) Date of Patent: Jan. 24, 2006

(54) METHOD OF MEASURING RECEIVER SENSITIVITY, AND TRANSCEIVER

(75) Inventor: Tommi J Huhtala, Oulu (FI)

(73) Assignee: Nokia Corporation, Espoo (FI)

( * ) Notice: Subject to any disclaimer, the term of this patent is extended or adjusted under 35 U.S.C. 154(b) by 361 days.

(21) Appl. No.: 10/116,756

(22) Filed: Apr. 5, 2002

(65) Prior Publication Data

US 2002/0154604 A1 Oct. 24, 2002

Related U.S. Application Data

(63) Continuation of application No. PCT/FI00/00856, filed on Oct. 4, 2000.

(30) Foreign Application Priority Data

Oct. 5, 1999 (FI) .............................................. 19992144

(51) Int. Cl.
*H04B 17/00* (2006.01)

(52) U.S. Cl. ...................... 455/226.2; 455/73; 455/126; 455/425

(58) Field of Classification Search .............. 455/226.1, 455/226.2, 226.3, 423, 424, 425, 115.1, 126, 455/73, 78–87, 67.11, 67.14
See application file for complete search history.

(56) References Cited

U.S. PATENT DOCUMENTS

| | | | |
|---|---|---|---|
| 5,442,811 A | 8/1995 | Kobayashi et al. | |
| 5,521,904 A | 5/1996 | Eriksson et al. | |
| 5,761,614 A | 6/1998 | Leitch et al. | |
| 5,790,944 A | 8/1998 | Karki et al. | |

FOREIGN PATENT DOCUMENTS

WO          WO 94/29976          12/1994

*Primary Examiner*—Lee Nguyen
(74) *Attorney, Agent, or Firm*—Pillsbury Winthrop Shaw Pittman LLP

(57) ABSTRACT

The invention relates to a method of measuring sensitivity of the receiving end in a transceiver, which comprises a transmitting and a receiving end. The transceiver includes a trasmission path between the transmitting end and the receiving end. The transceiver also connects a signal along the transmission path from the transmitting end of the transceiver to the receiving end of the same transceiver. In addition, the transceiver changes the level of the signal to be connected from the transmitting end to the receiving end. The transceiver transmits a test signal for determining properties of the transmission path. The transceiver transmits the signal changed by the attenuation means to the frequency band of the receiving end. The transceiver connects the transferred signal through the receiving end. Furthermore, the transceiver compares the signal transmitted from the transmitting end with the signal that has passed through the receiving end to determine sensitivity of the receiving end.

17 Claims, 2 Drawing Sheets

METHOD OF MEASURING RECEIVER SENSITIVITY, AND TRANSCEIVER

This application is a Continuation of International Application PCT/FI00/00856 filed Oct. 4, 2000 which designated the U.S. and was published under PCT Article 21(2) in English.

FIELD OF THE INVENTION

The invention relates to a method of measuring sensitivity of the receiving end in a transceiver.

BACKGROUND OF THE INVENTION

Radio systems employ different transmitters which transmit information signals to the receivers in the systems. In addition to information signals, the receivers receive different interference signals, which may include e.g. noise. The receiver always has a certain sensitivity which describes the receiver's ability of detecting signals sent by the transmitter from among noise or similar interference. Receiver sensitivity is particularly significant to succeeding of data transmission in the radio system. It is important to measure sensitivity because the sensitivity of a receiver may change due to a change in the temperature, for example. The temperature may have a considerable influence on the receiver sensitivity. The higher the quality of the components in the receiver, the smaller the influence of the temperature.

In GSM radio systems, for example, the sensitivity of a receiver, which is part of a base station, is measured by an external measurement device, which feeds a measurement signal to the receiver. From the receiver the measurement signal is connected to the transmitting end of the base station, from which the measurement signal is supplied back to the measurement device, which measures e.g. bit errors from the measurement signal. The measurement device sends measurement signals attenuated with various attenuation values to the receiver, in which case the receiver sensitivity can be determined.

The purchase price of the measurement device used in sensitivity measurement is still rather high, for which reason a measurement device is not always bought, and thus the receiver sensitivity is not measured at all. In practice, however, the receiver sensitivity is always measured one way or another because the receiver has to fulfil the sensitivity requirements set for it. In some cases deficiencies may occur in the function of a radio network if it is not checked by means of sensitivity measurement before the radio network is used that the receivers fulfil the sensitivity requirements set for them. In a prior art method sensitivity measurement requires service personnel at the location of the base station, where they measure sensitivity with a separate measurement device. The above-mentioned method is, however, slow and very laborious to implement in practice.

BRIEF DESCRIPTION OF THE INVENTION

An object of the invention is to provide a method and an apparatus implementing the method to solve the above-mentioned problems. This is achieved with the method described in the introduction, which is characterized by connecting a signal along a transmission path in the transceiver from the transmitting end of the transceiver to the receiving end of said transceiver, changing the signal level of the signal to be transmitted from the transmitting end to the receiving end and taking into account the influence of the transfer on the signal transmitted from the transmitting end to the receiving end, transferring the signal entering the receiving end through the receiving end, comparing the signal transmitted from the transmitting end with the signal that has passed through the receiving end and determining sensitivity of the receiving end on the basis of the comparison.

The object is also achieved with a method described in the introduction, which is characterized by connecting a signal along a transmission path in the transceiver from the transmitting end of the transceiver to the receiving end of said transceiver, adding a noise signal to the signal to be transmitted from the transmitting end to the receiving end to form a sum signal and taking into account the influence of the transfer on the signal transmitted from the transmitting end to the receiving end, transferring the sum signal entering the receiving end through the receiving end, comparing the signal transmitted from the transmitting end with the sum signal that has passed through the receiving end and determining sensitivity of the receiving end on the basis of the comparison.

The invention also relates to a transceiver which comprises a transmitting end and a receiving end.

The transceiver of the invention is characterized in that the transceiver comprises a transmission path between the transmitting end and the receiving end, a switching means for connecting a signal along said transmission path from the transmitting end of the transceiver to the receiving end of the same transceiver, an attenuation means for changing the level of the signal to be connected from the transmitting end to the receiving end, a means for transmitting a test signal for determining properties of said transmission path, a mixing means for transmitting the signal adapted by the attenuation means to the frequency band of the receiving end, a switching means for connecting the signal transferred through the receiving end by the mixing means, a control means for comparing the signal sent from the transmitting end with the signal that has passed through the receiving end to determine sensitivity of the receiving end.

The transceiver of the invention is also characterized in that the transceiver comprises a transmission path between the transmitting end and the receiving end, a switching means for connecting the signal along said transmission path from the transmitting end of the transceiver to the receiving end of the same transceiver, a generator for generating noise in said signal, a means for sending a test signal to the transmission path for determining properties of the transmission path, a switching means for connecting a signal to which noise has been added through the receiving end, a control means for comparing the signal connected by the switching means with the signal that has passed through the receiving end to determine sensitivity of the receiving end.

The preferred embodiments of the invention are disclosed in the dependent claims.

The invention is based on connecting a signal from the transmitting end of a transceiver to the receiving end of this transceiver. The signal to be connected is attenuated or noise is added to it. The amount of attenuation or noise in the signal is changed, which enables determination of receiver sensitivity. The method comprises determining a sensitivity value corresponding to each attenuation coefficient for the receiving end. The amount of noise to be added is changed from time to time, which allows determination of a sensitivity value corresponding to each amount of noise for the receiving end.

The method and transceiver according to the invention provide several advantages. Sensitivity measurement is integrated into the transceiver, which is e.g. a base station. Since the components that measure sensitivity of the receiving end of the transceiver are in the transceiver itself, there is no need for an external measurement device. One important advantage is that sensitivity measurement can be performed from the remote end by means of suitable management software. Thus service personnel do not need to go to the location of the base station to perform the measurement. The sensitivity measurement is quick to perform because no separate measurement connections or external measurement devices are needed. In addition, the sensitivity measurement provides a reliable result because measurement wires are unnecessary.

BRIEF DESCRIPTION OF THE DRAWINGS

The invention will be described in greater detail by means of preferred embodiments with reference to the accompanying drawings, in which.

DETAILED DESCRIPTION OF THE INVENTION

Figure 1:
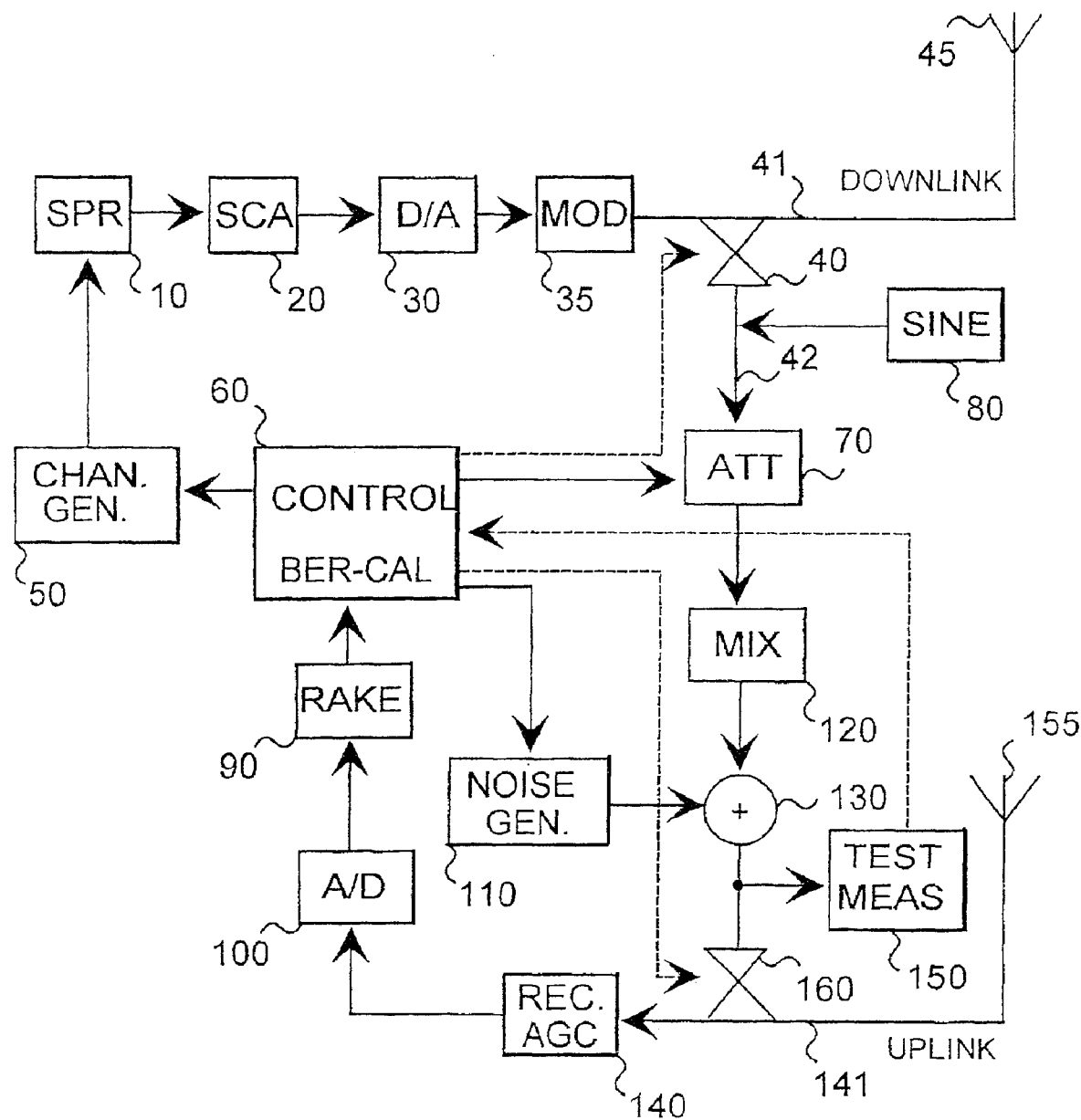
FIG. 1 illustrates a first preferred embodiment of a transceiver according to the invention.

FIG. 1 illustrates a transceiver of the invention which utilizes e.g. the CDMA method (CDMA=Code Division Multiple Access) or the WDCMA method (WDCMA=Wideband CDMA). The transceiver of the invention, which in practice is e.g. a base station, comprises a means 10, scaling means 20, D/A conversion means 30, modulation means 35, switching means 40, transmission antenna 45, channel generation means 50, control means 60, attenuation means 70 and generator 80. The means 10, 20, 30, 35, 40 and 45 are included in the transmitting end of the transceiver, which can also be called the downlink.

The transceiver also comprises a receiving means 90, A/D conversion means 100, generator 110, mixing means 120, adding means 130, receiver 140, receiving antenna 155, means 150 and switching means 160. The reception means 90 is preferably a RAKE receiver. The means 140, 100, 90 are included in the receiving end of the transceiver, which can also be called the uplink. The method according to the invention is suitable for measuring sensitivity of the receiving end.

Both switching means 40, 160 of the transceiver are preferably implemented with separate directional couplers. The generator 80 generates a predetermined signal, which may be e.g. a sine signal. In practice, the signal level of the predetermined signal at a given time is known or can be found out, if necessary.

If the transceiver is a GSM-type transceiver, the means 10, 20, 50 and 90, which are typically used in the CDMA system, are replaced with means that are suitable for a GSM-type transceiver. The receiver may apply e.g. the TDMA (TDMA=Time Division Multiple Access), the FDMA (FDMA=Frequency Division Multiple Access) or the CDMA multiple access methods. It can be seen in the figure that the transceiver comprises an uplink signal path 141 along which a signal is supplied to the transceiver. In practice, the receiving antenna 155 of the transceiver first receives an input signal arriving at the transceiver along the radio path. The transceiver receives the input signal arriving at its Rx band. The control means 60 in the transceiver generates different control and adjustment signals for controlling and adjusting the function of the transceiver. The control means can be implemented with a microprocessor, for example.

The transceiver sends a signal to the radio path along a downlink signal path 41. The transceiver sends the downlink signal to its Tx band by means of its transmission antenna 45. The method according to the invention comprises determining sensitivity of the receiving end, in which sensitivity is taken into account from the receiving antenna 155 to output of the receiving means 90. Sensitivity can be determined up to the output of the receiver because the control means can utilize the output signal of the receiving means 90 in the determination of sensitivity. The transceiver according to the invention includes the components used for measuring sensitivity, and thus no external measurement devices are needed in the sensitivity measurement.

In the following, the structure of the transceiver according to the invention will be described more closely. The output of a generation means 50 of the transceiver, which forms at least one physical channel, is connected to the means 10. The means 10 spreads a signal on the physical channel with a spreading code if the transceiver is of the CDMA type. The output of the means 10 is connected to the means 20, the output of which is connected to the input of the D/A converter 30. The output of the D/A converter 30 is connected to the input of the modulation means 35.

The output of the modulation means 35 is connected to the means 40, which can be implemented with a directional coupler, for example. The modulation means 35 and the switching means 40 are connected to the transmission antenna 45 on the downlink transmission path 41. The switching means 40 is connected to the attenuation means 70 by means of the transmission path 42, and the switching means is connected to the mixing means 120 by means of the attenuation means. In principle, the transmission path 42 continues up to the switching means 160. The output of the generator 80 is connected to the transmission path 42 between the switching means 40 and the mixing means.

The mixing means 120 is connected to the adding means 130, to which the output of the generator 110 is also connected. The output of the adding means 130 is connected both to the switching means 160 and to means 150. The attenuation means 70, mixing means 120 and adding means 130 are implemented with analogue parts which cause some noise in the signal that propagates via these means. The switching means 40, attenuation means 70, mixing means 120, adding means 130 and switching means 160 connect the transmitting end of the transceiver to the receiving end of the transceiver. This means that at least the attenuation means 70, mixing means 120 and adding means 130 are on the transmission path 42.

The receiving antenna 155 of the transceiver is connected to the receiver 140 via the uplink transmission path 141, and the output of the receiver is connected to the A/D conversion means 100. The output of the A/D conversion means is connected to the control means 60 via the receiving means 90, and the control means are connected to the generation means 50. The control means 60 is also connected to the attenuation means 70 and the generator 110. Furthermore, the control means is connected to both switching means 40, 160.

The method comprises first determining the noise caused by the components need to measure the sensitivity, which allows to take noise into account in the determination of sensitivity. This way the sensitivity value can be determined as accurately as possible. In practice, the method comprises determining the noise caused in the signal by the attenuation means 70, mixing means 120 and adding means 130 via which the signal is transmitted. A test signal is used for determining the nominal noise of the above-mentioned means. Determination of noise is very important because the signal that is used for determining the actual sensitivity is also transmitted via the above-mentioned means. The noise signal caused in the signal by the above-mentioned means is determined using a test signal generated by the generator 80, which may be e.g. a sine signal.

The method also comprises determining the attenuation caused by the attenuation means 70, mixing means 120 and adding means 130 in the signal connected by the switching means 40. Attenuation is measured according to the same principles as the above-mentioned nominal noise. A test signal is used in the measurement of attenuation. Attenuation is measured in the means 150, which transmits the result of attenuation measurement to the control means 60. The attenuation caused in the signal by the attenuation means 70, mixing means 120 and adding means 130 is take into account in the measurement of sensitivity.

The transceiver generates a signal which is transmitted to the channel established by the generation means 50. The signal transmitted to the channel is spreading-coded if the transceiver applies the CDMA or the WCDMA method. In the transceiver according to FIG. 1 the means 10 performs spreading-coding on the signal on the channel. A spreading-coded signal consisting of bits is supplied to the means 20, which scales the received signal.

According to the uplink channel model, the transceiver shown in FIG. 1 receives a signal which arrives at the receiving antenna 155 first. The uplink channel model or information on it can be transmitted from the uplink to the downlink. After this, a channel model corresponding to the channel model used at the uplink can be formed at the downlink. In practice, the uplink channel model is formed in the generation means 50. After this, the signals of the channel model formed by the generation means 50 are scaled in the means 20. In practice, the generation means 50 forms the channel model on the basis of a control signal which enters the generation means 50 from the control means 60.

Scaling means that the channel model formed by the means 50 is adapted so that it can be received at the uplink of the same transceiver. In scaling the length of a downlink channel is adapted to the length of the uplink channel. After scaling the downlink channel is as long as the uplink channel. The means 20 can change the number of bits on the channel in scaling. In addition to the means 20, scaling can be performed e.g. in the generation means 50.

A digital signal included in the uplink channel model formed by the generation means 50 is converted into analogue form in a D/A converter 30. After this, the analogue signal is modulated in the modulation means 35, and then the modulated signal is sent towards the switching means 40 in the downlink direction. The modulation means 35 modulates the received signal so that the receiver 140 can receive it. If necessary, the modulation means 35 can amplify the signal converted into analogue form. The uplink channel model formed by the generation means 50 is supplied up to the switching means 40 in the downlink direction. In other words, the antenna 45 does not receive any signal from the modulation means 35 in this situation.

In the measurement of sensitivity, a channel model differing from the channel model sent in the downlink direction in a normal situation is sent in the downlink direction. In this case the normal situation refers e.g. to a situation in which the transceiver sends a signal according to the downlink channel model to the radio path by means of the antenna 45. In a normal situation the signal transmitted in the downlink direction is used for establishing a connection to another transceiver.

In the solution according to the invention the switching means 40 connects the signal included in the channel model to the attenuation means 70. When sensitivity is measured, the switching means 40 prevents the signal from accessing the transmission antenna 45. It can be seen in FIG. 1 that a test signal generated by the generator 80 is inserted into the signal connected by the switching means 40. The switching means 40 thus connects the channel model which has propagated via the means at the downlink and corresponds to the uplink channel model to the uplink of the transceiver. The means 40, 70, 120, 130 and 160 in the transceiver constitute a feedback loop to which the signal which has been modulated by the modulation means 35 at the transmission end and corresponds to the uplink channel model is connected.

It can be seen in FIG. 1 that the control means 60 communicates with the attenuation means 70 which form part of the feedback loop. Furthermore, the control means communicates with the feedback loop via the generator 110. The control means 60 sends an adjustment signal to the attenuation means 70, which changes its attenuation on the basis of the received signal. Thus the control means adjusts the level of the signal that the signal switching means 40 transmits to the attenuation means 70. The level of the signal connected to the attenuation means 70 by the switching means 40 and the level of the output signal from the attenuation means 70 to the mixing means 120 are unequal if the attenuation used by the attenuation means 70 is changed. The mixing means 120 places the modulated and received signal, which is on the TX band, on the RX band of the receiver.

The influences of the attenuation means 70, mixing means 120 and adding means 130 on the modulated signal are eliminated from the output signal of the adding means 130, and the modulated signal is transmitted to the receiving end via the above-mentioned means. These influences are taken into account by reducing the noise of the signal received from the output of the adding means by an amount which was found out using the test signal.

During sensitivity measurement the signal arriving at the transceiver from the radio path is prevented from mixing into the signal which is transmitted to the receiver 140 via the adding means 130 and the switching means 160. The switching means 160 may even totally prevent a signal arriving from the radio path from accessing the receiver 140. In the last-mentioned situation the switching means 160 switches the transmission path 141 off for the duration of sensitivity measurement.

As stated above, the switching means 160 connects the analogue signal from the adding means to the receiver 140. The receiver 140 can apply automatic gain control (AGC), for example, on the received signal. After this, the signal received from the output of the receiver 140 is converted into digital form in the A/D conversion means 100. The analogue signal is supplied to the control means via the RAKE receiver 90. The control means calculates the bit errors that the means 140, 100 and 90 at the receiving end have caused in the signal connected by the switching means. More precisely, the control means calculates the bit error ratio using the signal that the switching means 40 connected to the attenuation means 70 and a signal which is received from the output of the RAKE receiver 90. It is easy to determine the bit error ratio because the bits of the transmitted and the received signal are known, in which case it is easy to compare the bits with one another.

The sensitivity value can also be expressed as a signal-to-noise ratio. In that case the control means 60 sends a control signal to the generator 110, which forms a noise signal including a certain amount of noise on the basis of the control signal, and the noise signal is transmitted to the adding means 130. In the adding means the noise signal is added to the signal from the means 120. The sum signal formed by the adding means is supplied to the switching means, which connects the sum signal to the means 140, from which the sum signal is supplied to the A/D conversion means 100. The A/D conversion means converts the sum signal into a digital signal, which is supplied to the means 90.

The control means 60 compares the sum signal with a signal to which no noise has been added. After this, the control means determines a sensitivity value corresponding to the added noise signal for the receiving end. This is followed by generating a new noise signal and calculating a sensitivity value of the receiver corresponding to this signal. The control means 60 thus controls the attenuation value of the attenuation means and the magnitude of the noise signal formed by the generator 110. It is possible to define a condition in advance that the sensitivity measurement and thus controlling of the attenuation and noise is continued e.g. until the bit error ratio obtained as a result of signal comparison decreases due to the controlling.

Figure 2:
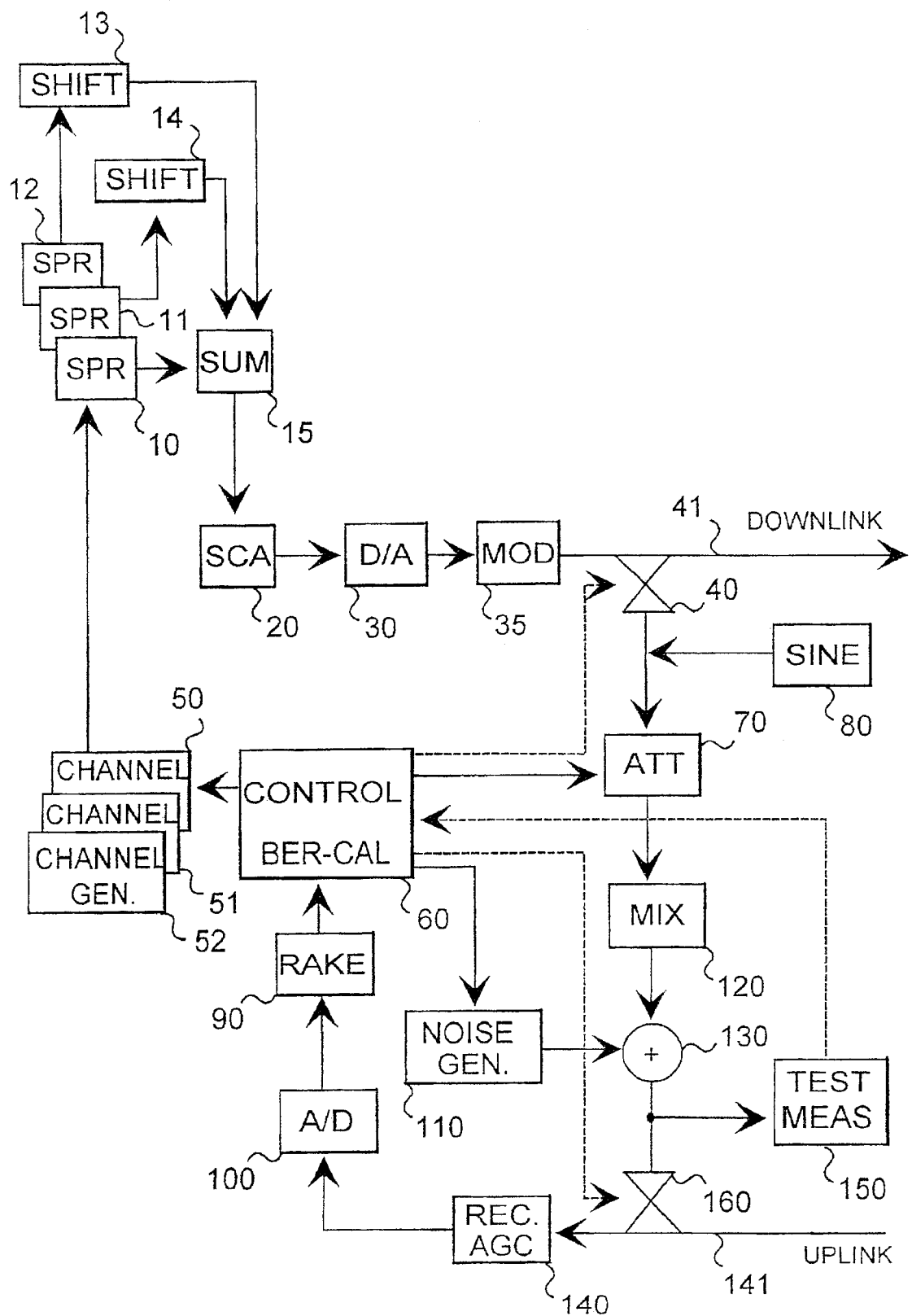
FIG. 2 illustrates a second preferred embodiment of a transceiver according to the invention.

FIG. 2 illustrates a transceiver which comprises, in addition to the means mentioned above, means 11, 12, 13 and 14. The transceiver shown in FIG. 2 also comprises an adding means 15 and generation means 51 and 52. Each of the generation means 50, 51, 51 is connected to a separate means 10, 11,12. It also appears from FIG. 2 that the output of the means 10 is connected to the adding means 15. The output of the means 11 is connected to the adding means 15 via the means 14. The output of the means 12 is also connected to the summing means 15 via the means 13.

Each of the generation means 50, 51, 52 forms a separate channel model. As stated above, the generation means 50 transmits the channel model it has formed to the means 10. Instead, the generation means 51 transmits the channel model it has formed to the means 11, and the generation means 52 transmits the channel model it has formed to the means 12. Each of the means 10, 11, 12 spreads the signal on the channel received by it with a spreading code. Each of the means 50, 51, 52 places the signal on a channel formed by it. The data transmission speeds of signal placed on different channels may vary.

The signal spread by the means 11 is sent to the means 14, which alters the phase of the spreading-coded signal. The signal spread in the means 12 is sent to the means 13, which also alters the phase of the received signal. The signals to which phase shift has been applied are supplied to the adding means 15, which adds these signals to the signal from the means 10.

The sum signal obtained from the output of the adding means 15 is supplied to the scaling means 20, which scales the sum signal according to the principles explained above. After scaling, the sum signal is converted into analogue form, and then the analogue sum signal is modulated. In modulation several channels are modulated into the same carrier wave. In other words, the output signal of the modulation means 35 comprises several channels.

The sub-signals that constitute the sum signal may have different data transmission properties. This means that the number of bits or symbols to be transmitted on the channel formed by each of the means 50, 51, 51 may vary depending on the channel. The different transmission speeds used on the channels cause interference, which causes bit errors in the signal which are measured as described above. Using the method related to FIG. 2 it is possible to find out how many bit errors the data transmission speed, transmitting end and receiving end cause in the signal. By means of this method it is also possible to find out how well the receiving end can receive a signal which comprises several signals each of which has a different data transmission speed. Thus the measurement related to FIG. 2 is particularly suitable for determining the capacity, for example.

Even though the invention has been described with reference to an example according to the accompanying drawings, it is clear that the invention is not limited thereto, but may be modified in various ways within the scope of the inventive concept disclosed in the appended claims.

What is claimed is:

1. A method of measuring sensitivity of the receiving end of a transceiver comprising:

connecting a signal along a signal path in the transceiver from the transmitting end of the transceiver to the receiving end of said transceiver, changing the signal level of the signal to be transmitted from the transmitting end to the receiving end and taking into account the influence of transfer on the signal to be transmitted from the transmitting end to the receiving end, transferring the signal entering the receiving end through the receiving end, comparing the signal sent from the transmitting end with the signal that has passed through the receiving end and determining sensitivity of the receiving end on the basis of the comparison, wherein the changing of the signal level is performed by attenuating the signal to be transmitted and using several attenuation coefficients and determining a sensitivity value corresponding to each attenuation coefficient for the receiving end.

2. A method according to claim 1, further comprising determining the influence of signal path on the signals transmitted on the signal path by transmitting a test signal along the signal path.

3. A method according to claim 1, further comprising determining the influence of signal path on the signals to be transmitted on the signal path by transmitting a test signal along the signal path and determining the properties of the signal path on the basis of the changes in the test signal during the transmission.

4. A method according to claim 1, further comprising determining sensitivity of the receiving end all the way from the receiving antenna by means of the method.

5. A method according to claim 1, further comprising converting the signal transmitted from the transmitting end to the receiving end to the frequency band of the receiver.

6. A method according to claim 1, further comprising determining sensitivity by comparing bits of the signal connected from the transmitting end with bits of the output signal of the receiver at the receiving end.

7. A method according to claim 1, wherein the signal to be connected to the transmission path in the method is in analogue form.

8. A method according to claim 1, further comprising adapting the signal to be transmitted along the transmission path during the transmission, and taking into account the influence of transfer by determining changes caused in the signal by adaptation and transfer.

9. A method according to claim 1, further comprising determining the attenuation caused in the signal by the transmission path and taking the attenuation into account when determining the receiver sensitivity.

10. A transceiver comprising a transmitting end and a receiving end,
- a transmission path between the transmitting end and the receiving end,
- a switching means for connecting the signal along said transmission path from the transmitting end of the transceiver to the receiving end of the same transceiver,
- an attenuation means for changing the level of the signal to be connected from the transmitting end to the receiving end,
- a means for transmitting a test signal for determining properties of said transmission path,
- a mixing means for transmitting the signal changed by the attenuation means to the frequency band of the receiving end,
- a switching means for connecting the signal transferred by the mixing means through the receiving end,
- a control means for comparing the signal transmitted from the transmitting end with the signal that has passed through the receiving end to determine sensitivity of the receiving end,
- wherein the transceiver comprises a means for removing the test signal before the test signal arrives at the switching means alone the transmission path.

11. A transceiver according to claim 10, wherein the transceiver comprises a modulation means for generating a modulated signal, and the signal connected by the switching means is said modulated signal.

12. A transceiver according to claim 10, wherein the means for transmitting a test signal is arranged to transmit a test signal through the attenuation means and the mixing means.

13. A transceiver according to claim 10, wherein the transceiver comprises a mixing means for transmitting the signal adapted by the attenuation means to the frequency band of the receiving end.

14. A transceiver according to claim 10, wherein the transceiver comprises a means for measuring attenuation caused by the transmission path.

15. A transceiver according to claim 10, wherein the transceiver comprises a receiving antenna and a receiving means, and the transceiver is arranged to determine sensitivity of its receiving end from the receiving antenna up to the output of the receiving means.

16. A transceiver according to claim 10, wherein the receiving end of the transceiver comprises a receiving means and for determining sensitivity the control means is arranged to compare bits of the signal transmitted from the transmitting end with bits of the output signal of the receiving means.

17. A transceiver according to claim 10, wherein the switching means is arranged to connect an analogue signal to the transmission path.

* * * * *